March 28, 1933.  C. H. STERLING  1,903,146

REAR AXLE CARRIER

Filed June 9, 1930  2 Sheets-Sheet 1

Inventor
Claude H. Sterling
By Blackmore, Spencer & Finch
Attorneys

March 28, 1933.  C. H. STERLING  1,903,146
REAR AXLE CARRIER
Filed June 9, 1930  2 Sheets-Sheet 2

Inventor
Claude H. Sterling
By Blackmore, Spencer & Flinn
Attorneys

Patented Mar. 28, 1933

1,903,146

UNITED STATES PATENT OFFICE

CLAUDE H. STERLING, OF SYRACUSE, NEW YORK, ASSIGNOR TO GENERAL MOTORS CORPORATION, OF DETROIT, MICHIGAN, A CORPORATION OF DELAWARE

REAR AXLE CARRIER

Application filed June 9, 1930. Serial No. 459,918.

This invention relates to motor vehicles and has particular reference to a rear axle carrier positioned at the differential in the rear axle.

Prior rear axle carriers have been made of a single malleable casting and the object of the present invention is to construct a new carrier which will eliminate the uncertainty which is inherent in castings of this kind.

In actual practice it has been found that there is considerable difficulty in machining due to the malleable casting running spotty, that is, portions are very hard to machine and other are not, which gives the effect of an intermittent cut causing chattering and considerable machining difficulty. There is also the possibility of shrinks occurring in the castings which may not be apparent in the usual manufacturing inspection and which sometimes show up after some of the machining operations have been performed and in other cases they do not show up at all until the carrier is installed and sometimes result in porosity, which causes oil leaks, and sometimes failure.

The object of the invention is accomplished by making what is commonly called the pedestal portion of the carrier by forging and the barrel and bowl portion of a steel pressing or stamping. The barrel and bowl portions may be constructed either integral or separate, the separate construction being preferred for the reason that it simplifies the drawing operation insofar as the bell section is concerned and will make a cheaper manufacturing proposition. The bell or bowl pressing or stamping can be drawn hot and provided with suitable indentations or recesses which will afford lubricant passages in final assembly.

Figure 1:
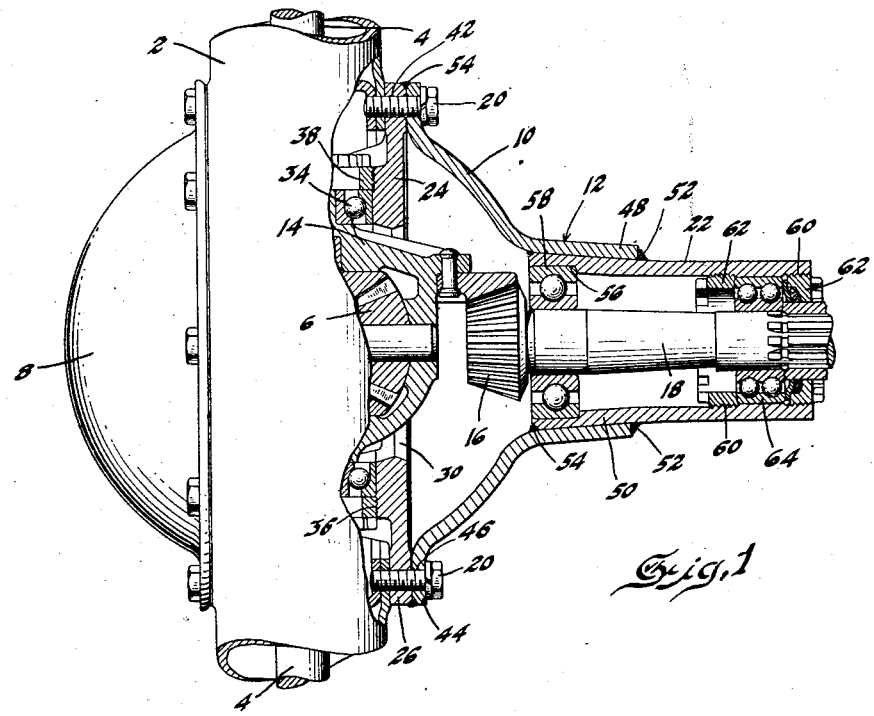
Figure 1 is a partial sectional view showing the invention applied to the rear axle of an automotive vehicle.

On the drawings, the numeral 2 indicates the rear or dead axle of an automotive vehicle having the live axles 4 housed therein. The live axles are interconnected by means of the differential indicated at 6 and confined in the central portion of the axle housing 2 by means of the differential housing 8, a portion of which is formed by the bowl shaped portion 10 of the novel axle carrier indicated as a whole at 12. The differential is driven through the gear 14 attached thereto and driven from the gear 16 rigidly mounted on the propeller shaft 18. The rear axle carrier 12 is secured to the rear axle housing 2 by means of the bolts 20.

The invention is particularly concerned with the rear axle carrier 12, the preferred species of which is shown in Figure 1. The rear axle carrier comprises the bowl or bell shaped portion 10, the barrel portion 22 and the saddle portion 24. The forged saddle portion 24 is the same in all species and comprises the ring portion 26 and the two spaced arms 28. The saddle is provided with the opening 30 in which the gear 14 is received. Each arm 28 is provided with the plane portion 32 to receive the outer race of the ball bearing 34 and the threaded portion 36 in which there is received the threaded ring 38 adapted to hold the ball bearing 34 in place. Suitable caps (not shown) are placed over the arms 28 and secured thereto by machine bolts threaded into the openings 40. The flange 26 is provided with openings 42 to accommodate the bolts 20.

The bell or bowl shaped portion 10 of the rear axle carrier is suitably shaped to receive the gears 14 and 16 and is formed of a steel pressing or stamping. It has the outer flanged portion 44 which is shaped to conform to the flange 26 on the saddle 24. Suitable openings 46 are provided in the flange 44, which openings conform to the openings 42 to accommodate the bolts 20. The bowl shaped portion 10 terminates in the collar or neck 48 which is preferably tapered and is adapted to receive the tapered portion 50 of the barrel portion 22. Both the barrel portion 22 and the saddle 24 are secured to the bowl portion 10 preferably by welding as shown at 52 and 54, although bolts or other suitable means may be used. The innermost portion of the barrel portion 22 is provided with an annular machined portion 56 adapted to receive a ring or the outer race of the bearing 58 for the propeller shaft 18. The end of the barrel portion farthest away from the differential is provided with two threaded portions 60 adapted to receive the threaded rings 62 which are for the purpose of holding the ball bearing 64 in place.

Both the bowl portion 10 and the barrel portion 22 are formed of steel pressings or stampings which give a great deal more rigidity than can be obtained with the conventional malleable casting because they permit uniform conditions at sections of largest proportions and at which the malleable defects occur at the present time. Greater uniformity is also obtained in the machine operation and a cheaper and easier manufactured rear axle carrier is obtained.

In forming the bowl portion 10 and the barrel portion 22, suitable spaces 66 and 68 are formed therein which, when the bearing 58 is in place, will form lubricant openings or passages between the ring and carrier. This will permit the lubricant in the rear axle to be thrown into the barrel portion of the carrier for lubrication of the forward bearing and also provide for a return to maintain the oil at a certain level.

Figure 2:
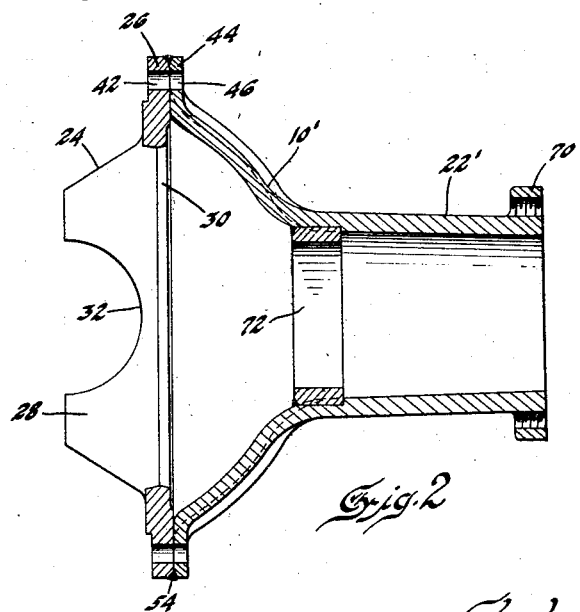
Figures 2 and 3 are sectional views of a modified form of the invention.

The structure of Figure 2 differs from that of Figure 1 in that the bowl portion 10' and the barrel portion 22' are formed in one piece and the barrel has the flange 70 at the end thereof to permit of its ready attachment.

Figure 3:
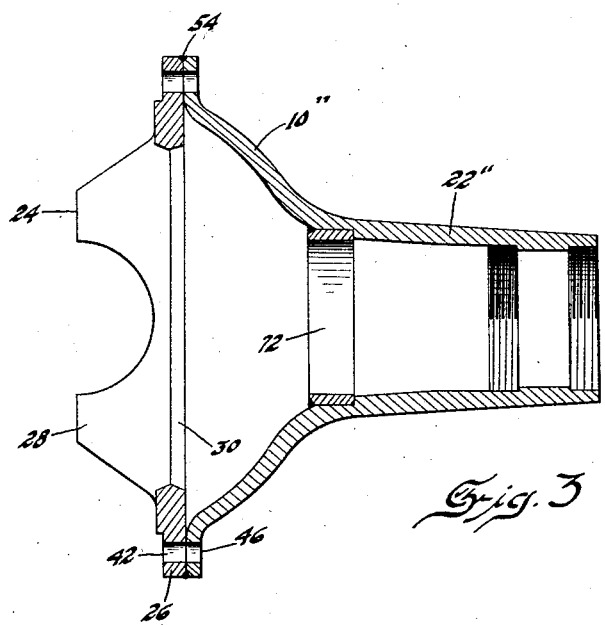
Figure 4:
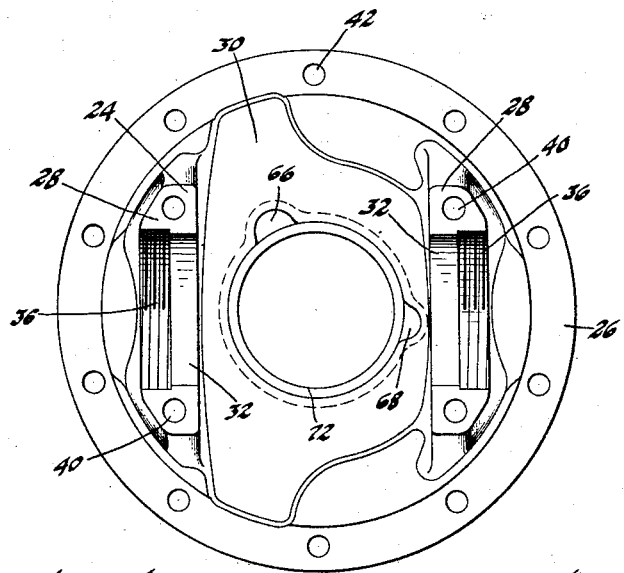
Figure 4 is an end view looking from the left of the structure of Figures 2 and 3 and the corresponding portion of Figure 1.

Figure 3 differs from Figure 1 solely in that the bowl portion 10" and the barrel portion 22" are formed in one piece and a ring 72 is placed therein to serve as a mounting for the ball bearing 58. The same ring is shown in the species of Figure 2.

I claim:

1. In an axle carrier comprising a pressed steel bowl portion, a pressed steel barrel portion welded to said bowl portion, a bearing ring secured at the junction of said bowl and barrel portion, said carrier having formed therein a lubricant opening at said ring and a forged saddle portion secured to said bowl portion.

2. In an axle carrier comprising a pressed steel bowl portion, a pressed steel barrel portion secured to said bowl portion, a bearing ring secured at the junction of said barrel and bowl portions, said carrier having a plurality of lubricant openings at said ring, and a forged saddle portion secured to said bowl portion.

3. In an axle carrier comprising a pressed steel bowl portion, a pressed steel barrel portion secured to said bowl portion, a bearing supporting ring secured at the junction of said barrel and bowl portions, said carrier having a plurality of lubricant openings between said ring and bowl, and a forged saddle portion secured to said bowl portion.

In testimony whereof I affix my signature.

CLAUDE H. STERLING.